(12) United States Patent
Eshita et al.

(10) Patent No.: US 8,276,862 B2
(45) Date of Patent: Oct. 2, 2012

(54) STAND FOR IMAGE DISPLAY DEVICE

(75) Inventors: Shusuke Eshita, Tokyo (JP); Hajime Ogura, Kanagawa (JP); Hirotaka Tako, Kanagawa (JP); Wataru Tajika, Tokyo (JP); Yoshiichi Tokuda, Tokyo (JP); Ichiro Funakoshi, Tokyo (JP)

(73) Assignee: Sony Corporation, Tokyo (JP)

( * ) Notice: Subject to any disclaimer, the term of this patent is extended or adjusted under 35 U.S.C. 154(b) by 667 days.

(21) Appl. No.: 12/151,616

(22) Filed: May 8, 2008

(65) Prior Publication Data

US 2008/0296448 A1 Dec. 4, 2008

(30) Foreign Application Priority Data

May 30, 2007 (JP) ................................ P2007-144163

(51) Int. Cl.
*E04G 3/00* (2006.01)

(52) U.S. Cl. .................. 248/274.1; 248/371; 248/176.1; 248/160; 361/679.06; 361/679.23; 312/7.2; 312/317.2; 312/317.1; 348/373; 348/836; 348/843

(58) Field of Classification Search ............ 312/7.2, 312/223.3, 245, 205, 317.2, 317.1, 318, 285, 312/289, 351.14; 211/41.82, 42, 86.01, 86; 348/825, 373, 836, 843; 361/681, 679.01, 361/679.02, 679.06, 679.23; 345/156, 905; 248/176.1, 274.1, 127, 160, 917–923, 371; 108/147

See application file for complete search history.

(56) References Cited

U.S. PATENT DOCUMENTS

| D517,838  | S  | * | 3/2006  | Luong ............................ D6/477 |
| 7,270,383 | B2 | * | 9/2007  | McElheney .................... 312/7.2 |
| D552,051  | S  | * | 10/2007 | Lozano ........................ D14/129 |
| 7,472,971 | B2 | * | 1/2009  | Schmieder et al. ........ 312/223.3 |
| D622,275  | S  | * | 8/2010  | Lozano ........................ D14/451 |
| 7,984,888 | B2 | * | 7/2011  | Park ......................... 248/281.11 |
| 2002/0084727 | A1 | * | 7/2002 | Miller .......................... 312/205 |
| 2004/0135476 | A1 | * | 7/2004 | Gillengerten ................ 312/8.16 |

FOREIGN PATENT DOCUMENTS

| JP | 11-03044 A   | 4/1989  |
| JP | 11-37388 A   | 5/1989  |
| JP | 10-292898 A  | 11/1998 |
| JP | 2001-290436 A | 10/2001 |
| JP | 2003-316286 A | 11/2003 |
| JP | 2005-286987 A | 10/2005 |
| JP | 2007-027873 A | 2/2007  |
| JP | 2007-108528 A | 4/2007  |

\* cited by examiner

*Primary Examiner* — Teri P. Luu
*Assistant Examiner* — Todd M Epps
(74) *Attorney, Agent, or Firm* — Lerner, David, Littenberg, Krumholz & Mentlik, LLP (57) ABSTRACT

There is provided a stand for an image display device supporting a flat-plate-like image display device. The stand for an image display device is provided with: a plane plate member in which the outside dimension is larger than that of the outside frame of the image display device, and the back face may be arranged in such away that the back face contacts the wall surface; a leg portion installed on the opposite side to the wall surface at the lower end of the plane plate member; and an arm member connecting the back face of the image display device and the front face of the plane plate member in such a way that the image display device may be moved.

9 Claims, 11 Drawing Sheets

STAND FOR IMAGE DISPLAY DEVICE

CROSS-REFERENCE TO RELATED APPLICATIONS

The present application claims priority from Japanese Patent Application No. JP 2007-144163, filed in the Japanese Patent Office on May 30, 2007, the entire content of which is incorporated herein by reference.

BACKGROUND OF THE INVENTION

1. Field of the Invention

The present invention relates to a stand for an image display device.

2. Description of the Related Art

Recently, a large, thin, and flat-plate-like image display device such as a liquid crystal display, a plasma display, and an organic electroluminescent display has been developed. As such a flat-plate-like image display device requires arrangement considering harmony with indoor design, securing arrangement space, and the like, there has been required an arrangement in which an image display device is integrated with and arranged on an interior wall surface, considering the requirement.

An arrangement meeting the above requirement includes, for example, a so-called wall-hung arrangement, in which a flat-plate-like image display device is arranged on a wall surface, and an arrangement in which a furniture-type stand covering a whole wall surface is used.

(Patent Document 1) Japanese Patent Application Laid-Open No. 2007-027873

(Patent Document 2) Japanese Patent Application Laid-Open No. 2007-108528

SUMMARY OF THE INVENTION

However, according to the wall-hung arrangement according to the related technologies, and the arrangement using a furniture type stand covering a whole wall surface, arrangement by a user oneself has not been easy, and work and arrangement by a specialist have been required. Moreover, when a connector of an image display device is arranged at the back, when wires are buried in a wall, and the like re-wiring, and maintenance work such as repairing for an image display device has been also difficult for a user to require further work and the like by a specialist.

Then, the present invention has been made considering the above-described issues, and it is desirable to realize easy arrangement, and to improve maintenance work after arrangement by integrating a flat-plate-like image display device with a wall surface.

According to an embodiment of the present invention, there is provided a stand for flat-plate-like image display device in order to solve the above-described issue, wherein the stand supports a flat-plate-like image display device, and the stand is provided with: a plane plate member in which the outside dimension is larger than that of the outside frame of the image display device, and the back face may be arranged in such a way that the back face contacts the wall surface; a leg portion installed on the opposite side to the wall surface at the lower end of the plane plate member; and an arm member connecting the back face of the image display device and the front face of the plane plate member in such a way that the image display device may be moved.

As an arrangement in which the plane plate member contacts the wall surface is possible according to the above configuration, the stand for an image display device may be integrated with the wall surface for arrangement, and the outside dimension of the plane plate member is larger than that of the outside frame of the image display device. Accordingly, when seen from the forward, it seems as if the plane plate member covered the surroundings of the image display device, and there is enhanced integration feeling of the stand for an image display device and the image display device. Therefore, there may be realized an arrangement in which the image display device is integrated with and arranged on the wall surface. Moreover, the stand for an image display device is arranged in such a way that the stand is not fixed to the wall surface, the back face of the plane plate member contacts the wall surface, and the device is supported by the leg portion. Therefore, arrangement and movement of the stand for an image display device may be easily realized. Furthermore, the image display device is supported by the arm member in such a way that the device may be moved. Accordingly, an arrangement position and an arrangement attitude of the image display device may be changed, and access to the back face of the image display device may be easily realized. Furthermore, wiring may be easily performed at arrangement and maintenance of the image display device.

Moreover, there may be provided with an accommodation portion which is formed on the front face side of the plane plate member and may accommodate at least a part of the back face side of the image display device, and a heat exhausting unit which is arranged on the back face side of the plane plate member, and by which heat generated by the image display device is exhausted from the accommodation portion. As heat generated by the image display device may be exhausted from the accommodation portion by the exhausting unit according to the above configuration, at least a part of the image display device may be accommodated in the accommodation portion. Moreover, at least a part of the back face side of the image display device is accommodated in the accommodation portion. Therefore, proximity feeling of the image display device to the plane plate member may be enhanced, and the integration feeling of the image display device and the wall surface may be further improved.

The heat exhausting unit may be a heat exhausting hole which is formed on the back face side of the plane plate member, and extends from the accommodation portion toward above the plane plate member. According to the above configuration, heat, which has been generated by the image display device and has been transmitted to the accommodation portion, may be exhausted toward above the plane plate member by the heat exhausting hole.

Moreover, a wiring space may be formed below an arrangement position of the image display device of a plane plate member, wherein the wiring space is open to the front face direction of the plane plate member, and wires for the image display device are arranged in the wiring space. According to the above configuration, the wires for the image display device may be arranged in the wiring space. Accordingly, arrangement of the image display device may be realized by exposing the wires for the image display device to the outside without impairing the indoor design. Furthermore, it is possible to easily access wires arranged in the wiring space, because the wiring space is open to the front face direction of the plane plate member.

Furthermore, there may be provided a peripheral-device accommodation portion which is slidably arranged on the leg portion, and accommodates peripheral devices which are connected to the image display device. According to the above configuration, the peripheral-device accommodation portion may accommodate the peripheral devices, and the accommodation portion may be sled on the leg portion. Accordingly, the back face of the peripheral device accommodated in the peripheral-device accommodation portion, and the front face of the plane plate member and the like may be easily accessed.

Moreover, there may be provided with: a first connection portion which is arranged at a position facing the peripheral-device accommodation portion of the plane plate member and may connect wires from a plurality of peripheral devices which are accommodated in the peripheral-device accommodation portion; a second connection portion which is arranged at a position facing the image display device of the plane plate member and may connect wires to the image display device; and a selection portion which is connected to the first connection portion and the second connection portion, and selects a signal output to the image display device through the second connection portion from signals which are output respectively from a plurality of peripheral devices and are input to the first connection portion. According to the above configuration, wires from a plurality of the peripheral devices may be connected to the first connection portion. Then, the selection portion may select a signal to be output to the image display device from signals output respectively from the plurality of the peripheral devices for output to the second connection portion. Furthermore, a signal output from the selection portion may be output to the image display device because wires to the image display device may be connected to the second connection portion. Accordingly, wiring may be simplified in comparison with a case in which wires from the plurality of the peripheral devices are connected directly to the image display device. And, wiring may be realized only by connecting predetermined wires to the first connection portion, or the second connection portion. Therefore, wiring troubles at arrangement, or those at maintenance may be reduced.

There may be further provided a display portion which is arranged on the front face of the plane plate member, and displays operation states of the image display device. According to the above configuration, operation states of the image display device may be displayed by the display portion. Accordingly, the image display device and the stand for the image display device may be functionally integrated with each other, and the integration feeling of the stand for the image display device and the image display device may be improved.

Furthermore, the plane plate member may be provided with a speaker arrangement portion in which a speaker unit and a speaker amplifier are arranged. According to the above configuration, a speaker unit and a speaker amplifier may be arranged on the plane plate member by the speaker arrangement portion. Therefore, the image display device and the stand for the image display device may be functionally integrated with each other, and the integration feeling of the image display device and the stand for the image display device may be improved.

Furthermore, the plane plate member may be provided with a tuner arrangement portion in which a television tuner is arranged. According to the above configuration, a tuner may be arranged on the plane plate member by the tuner arrangement portion. Accordingly, the image display device and the stand for the image display device may be functionally integrated with each other, and the integration feeling of the image display device and the stand for the image display device may be improved.

According to the embodiments of the present invention described above, easy arrangement, and improved maintenance after arrangement may be realized by integrating a flat-plate-like image display device with a wall surface.

DETAILED DESCRIPTION OF THE PREFERRED EMBODIMENTS

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

<Appearance and Outline Configuration of Stand 100 for Image Display Device>

First, an appearance and an outline configuration of a stand for an image display device (hereinafter, called "stand") according to one embodiment of the present invention will be explained referring to FIG. 1 through FIG. 3.

Figure 1:
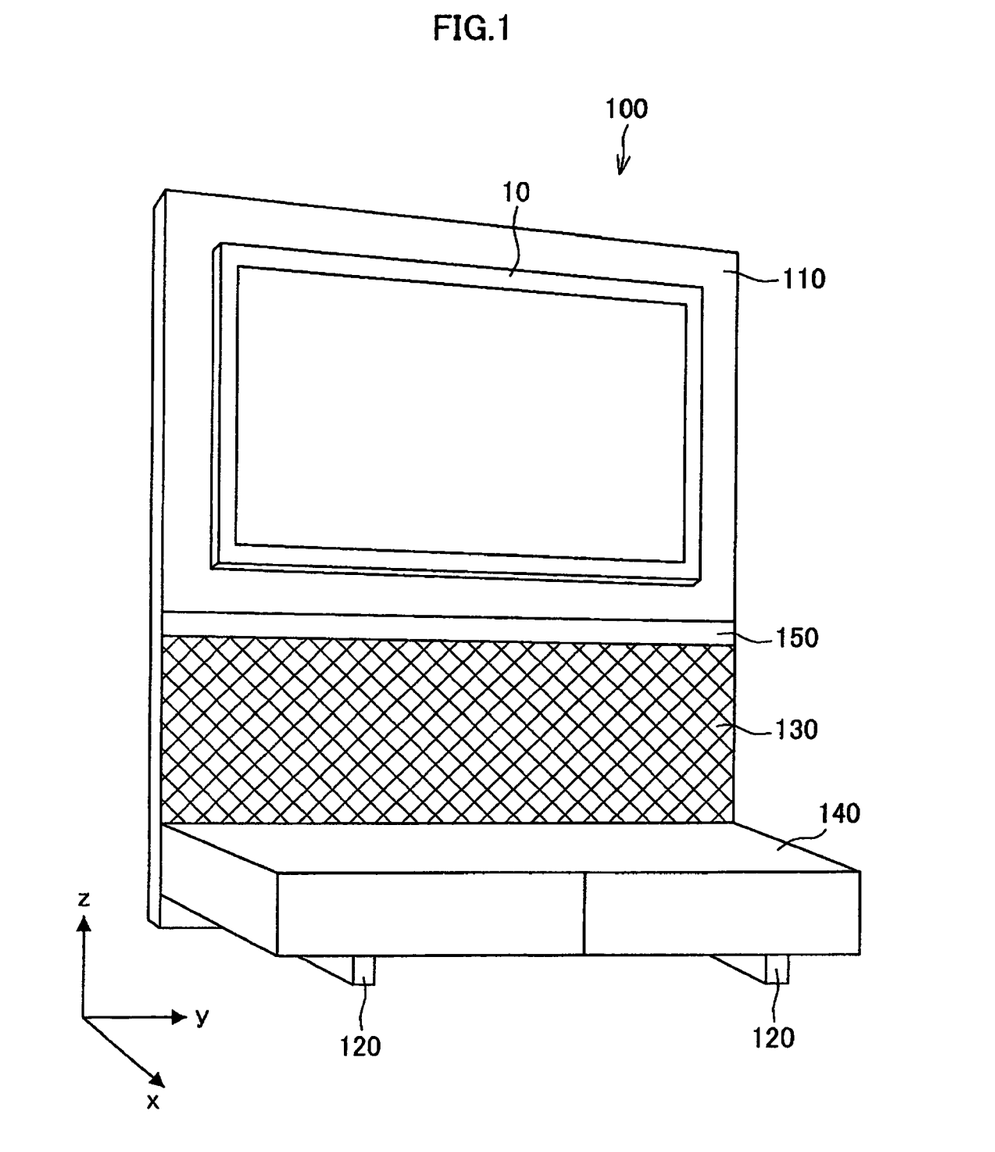
FIG. 1 is a perspective view explaining the outline of a configuration of a stand according to one embodiment of the present invention.
Figure 2:
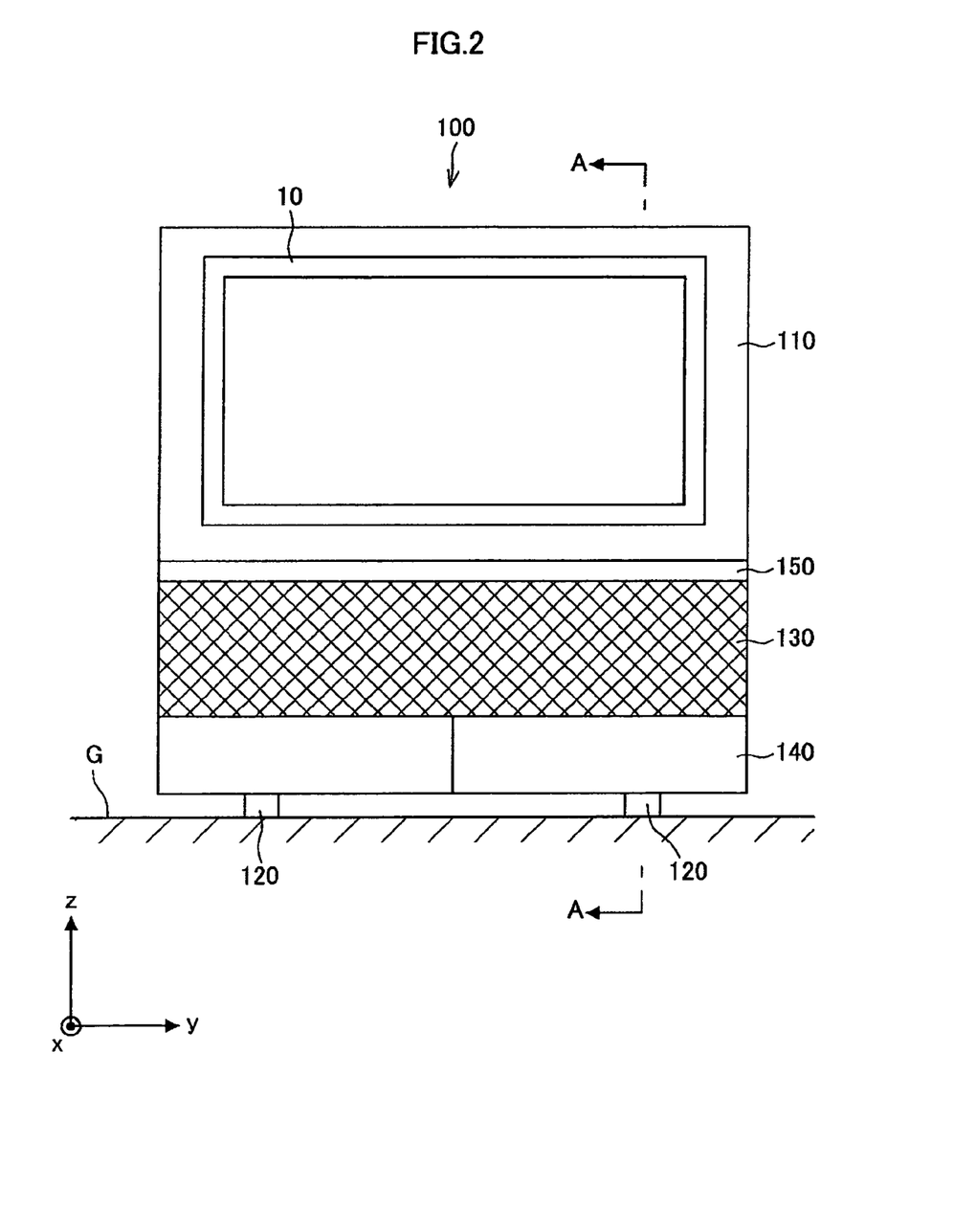
FIG. 2 is a front view explaining the outline of the configuration of the stand according to the embodiment.
Figure 3:
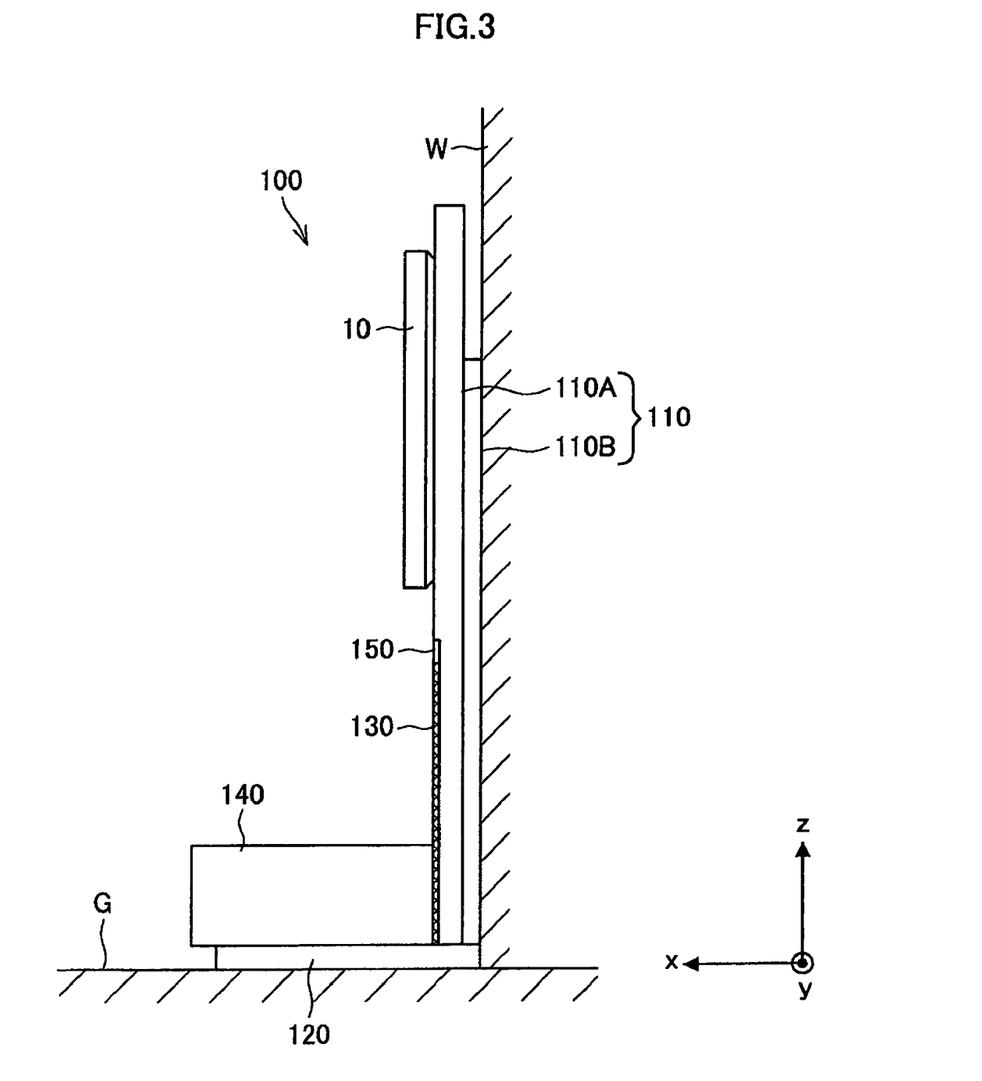
FIG. 3 is a side view explaining the outline of the configuration of the stand according to the embodiment.

FIG. 1 is a perspective view explaining the outline of the configuration of the stand according to the present embodiment, FIG. 2 is a front view explaining the outline of the configuration of the stand according to the present embodiment, and FIG. 3 is a side view explaining the outline of the configuration of the stand according to the present embodiment.

As shown in FIG. 1, the stand 100 is a stand with a shape of an approximately "L" character, which is arranged in a state in which the stand 100 contacts the indoor wall surface W. And, a flat-plate-like image display device 10 (hereinafter, also called "television") is arranged on the front face of the upper portion of the stand.

The stand 100 is configured to be arranged at a position at which the stand 100 may be viewed from the outside, and includes a plane plate member 110, a leg portion 120, a net grill 130, a rack 140, and a display portion 150.

The plane plate member 110 is a member supporting a television 10, and, as shown in FIG. 3, is vertically arranged to a floor surface G in a state in which the back face contacts the wall surface W. As shown in FIG. 2, the plane plate member 110 is formed with an outside dimension larger than that of the outside frame of the television 10. Accordingly, the integration feeling of the stand 100 and the wall surface W, and that of the stand 100 and the television 10 may be improved, because the plane plate member 110 is arranged in such a way that the plane plate member 110 covers the whole outside frame of the television 10 when viewed from the front. Here, as the integration feeling of the wall surface W and the plane plate member 110 is lost when the thickness of the plane plate member 110 is too thick, the thickness is preferably formed thinner than that of the outside dimension of the other portions.

The leg portion 120 is a member which supports the plane plate member 110 and the like in such a way that the plane plate member 110 does not fall forward. As shown in FIG. 2 and FIG. 3, the leg portion 120 is installed forward (in the opposite side to the wall surface W, in the positive direction of the X-axis) of the lower end of the plane plate member 110, and is mounted on the floor surface G. Accordingly, the leg portion 120 and the plane plate member 110 form (refer to FIG. 3) the main body of the stand with a shape of an approximately "L" character, wherein the stand supports the whole load such as the television 10. In the present embodiment, the leg portion 120 is assumed to be formed in a shape of a square pole which is installed forward of the lower end of the plane plate member 110. However, the present invention is not limited to the above-described example. The leg portion 120 may be formed in one, or a plurality of flat plates, by which the leg portion 120 may be mounted on the floor surface G, or the leg portion 120 may be formed in another shape.

The net grill 130 is arranged in the front of the plane plate member 110, and covers components such as the speaker units, which are arranged in the plane plate member 110, and the like. The net grill 130 protects components such as the speaker unit, and, at the same time, the above components may be prevented from exposing to the outside and being viewed. Accordingly, when seen from the outside, the stand 100 and the wall surface W may be integrated with each other in a more improved manner by arranging the net grill 130.

The rack 140 is one example of the peripheral-device accommodation portion accommodating peripheral devices which may be connected to the television 10, wherein the peripheral devices include an audio-video (AV) apparatus such as a video deck, and a hard disk (HDD) recorder, a game machine, and the like. The rack 140 is mounted on the leg portion 120, and is arranged in contact with the plane plate member 110 through the net grill 130 as shown in FIG. 3.

The display portion 150 is arranged at a position between the net grill 130 and the television 10 on the front surface of the plane plate member 110, as shown in FIG. 2, and displays operation states of the television 10. As described above, the integration feeling of the television 10 and the stand 100 may improved by displaying the operation states of the television 10. Accordingly, integration feeling of the television 10 and the wall surface W may be improved further.

When the stand 100 is installed on the wall surface W, the above-described configuration is a configuration in which the member may be viewed from the outside. According to the stand 100, the integration feeling of the stand 100 and the wall surface W, and that of the television 10 and the stand 100 may be improved by the above-described configuration, and the television 10 may be arranged in harmony with the indoor design.

Moreover, the integration feeling with the wall surface W may be secured for arrangement of the television 10 according to the stand 100, and the wall surface W may be separated. In other words, it has been difficult for a general user to arrange the television 10, and a work by a specialist concerned has been required for the arrangement because the television 10 is arranged directly on the wall surface in the wall-hung arrangement according to the related technologies. However, according to the stand 100 according to the present embodiment, by a configuration in which the stand 100 supporting the television 10 is arranged to contact the wall surface W, the television 10 may be easily arranged in such a way that the television 10 is integrated with the wall surface W.

<Change in Arrangement Position, and Arrangement Attitude of Television 10>

In the above-described configuration, the stand 100 which may be viewed from the outside movably supports the television 10. That is, according to the stand 100, the arrangement position and the arrangement attitude of the television 10 may be changed (hereinafter, called "displacement".) Thereby, the configuration of the stand 100 and the displacement of the television 10, and the like will be explained referring to FIG. 4 through FIG. 7B.

Figure 4:
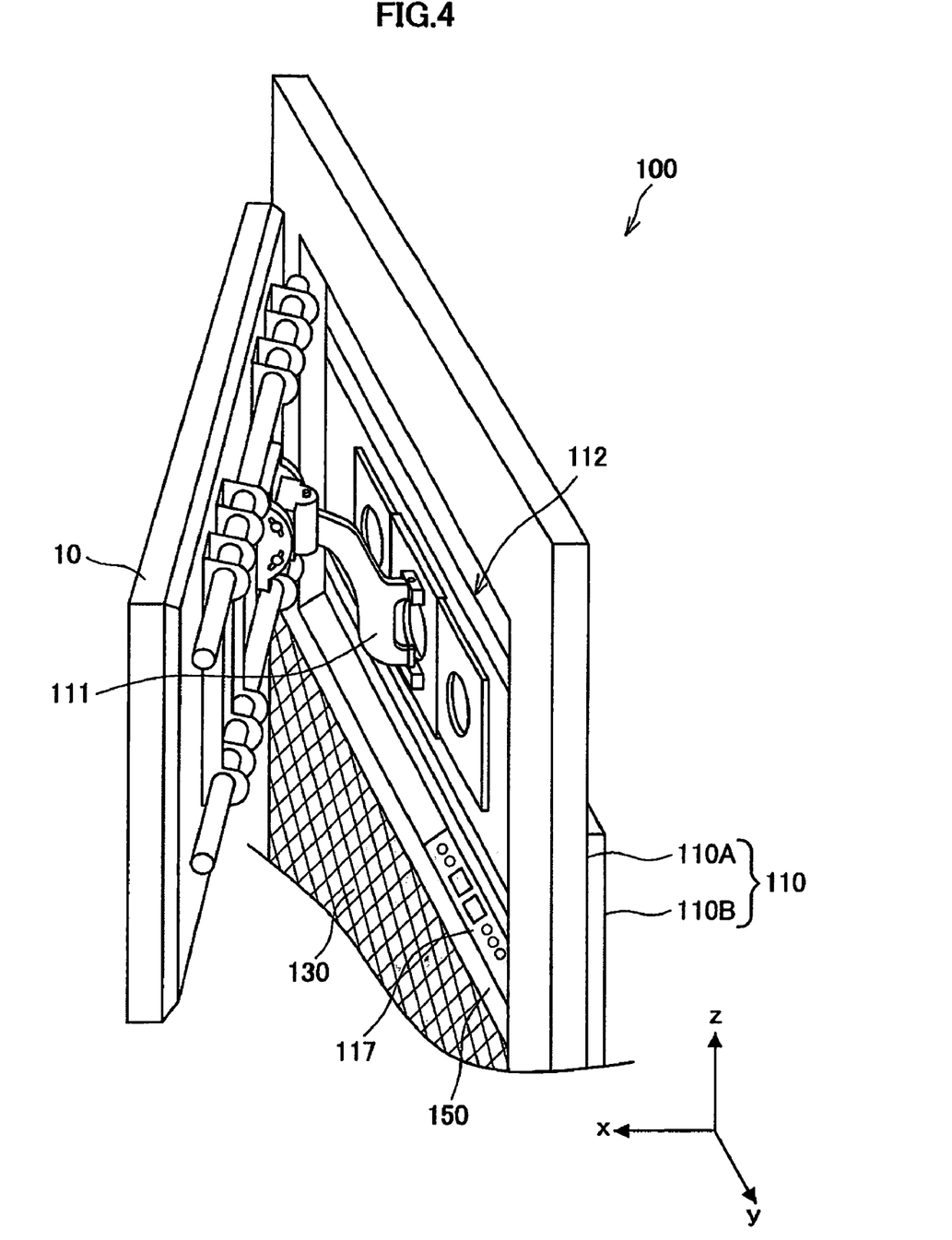
FIG. 4 is a perspective view explaining an arm member included in the stand according to the embodiment.
Figure 5A:
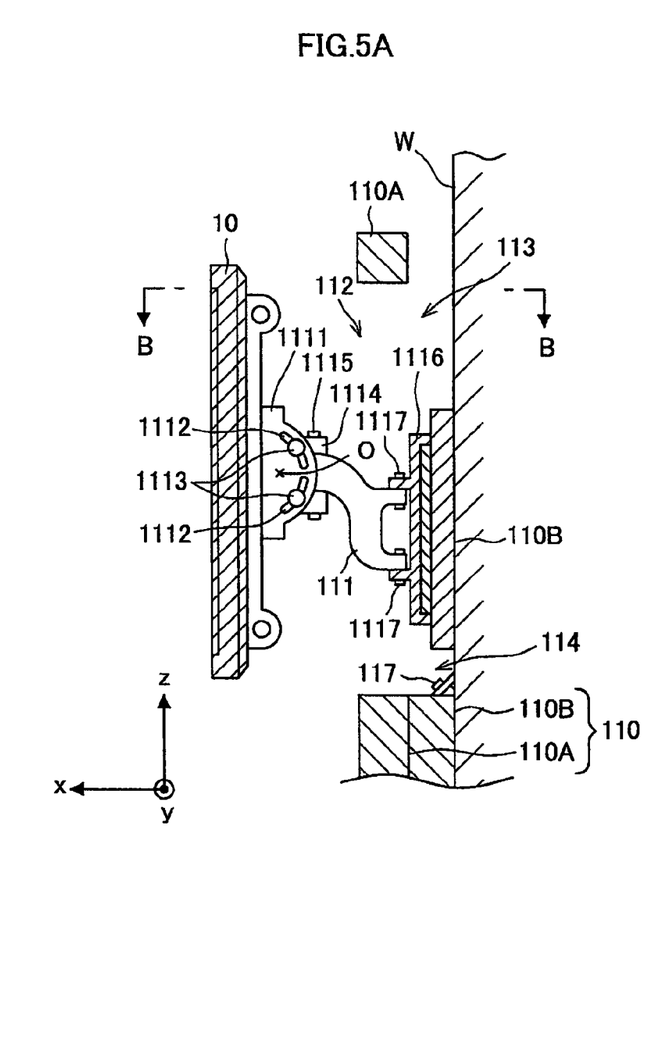
FIG. 5A is a cross sectional view explaining the arm member included in the stand according to the embodiment.
Figure 5B:
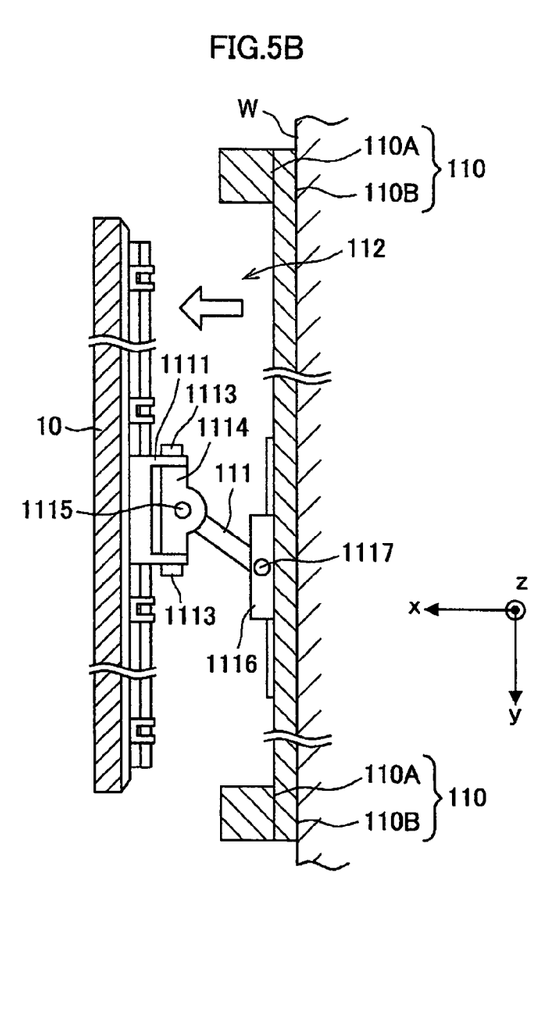
FIG. 5B is a cross sectional view explaining an arm member included in the stand according to the embodiment.

FIG. 4 is a perspective view explaining an arm member included in the stand according to the present embodiment. FIG. 5A and FIG. 5B are cross sectional views explaining an arm member included in the stand according to the present embodiment. Here, FIG. 5A is a partial cross sectional of the arm member seen from the side (y axis direction) when the stand is cut along the line A-A of FIG. 2. FIG. 5B is a partial cross sectional view of the arm member seen downward from the above (z axis direction) when the stand is cut along the line B-B of FIG. 5A.

Figure 6A:
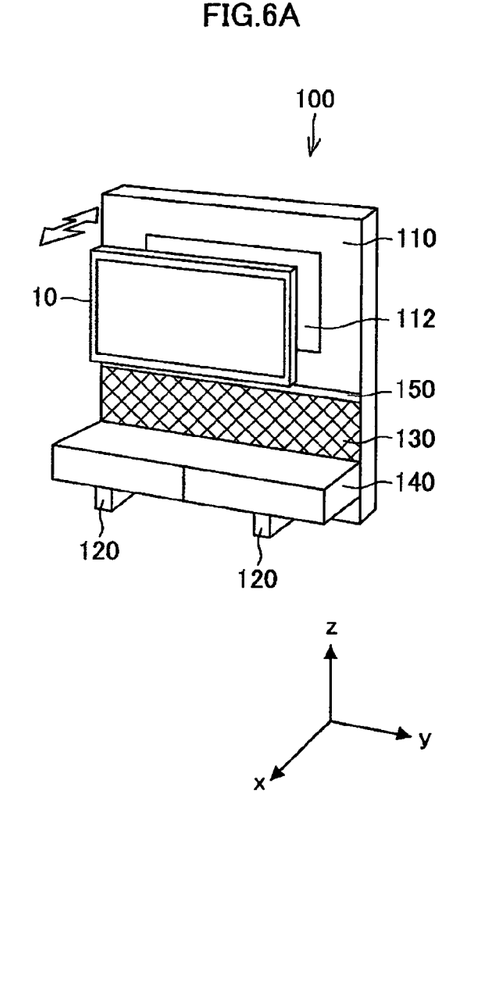
FIG. 6A is an explanation view explaining one example of a displacement of a television by a stand according to the embodiment.
Figure 6B:
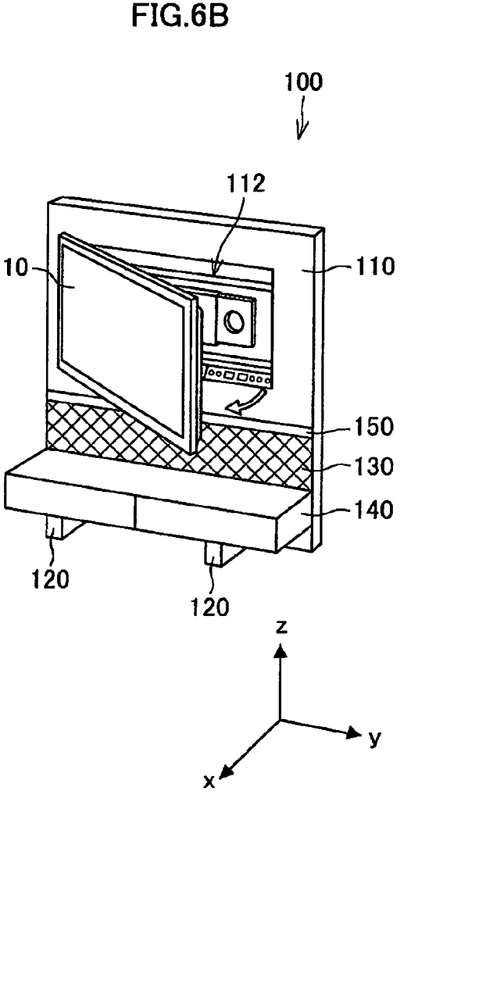
FIG. 6B is an explanation view explaining one example of a displacement of the television by the stand according to the embodiment.
Figure 7A:
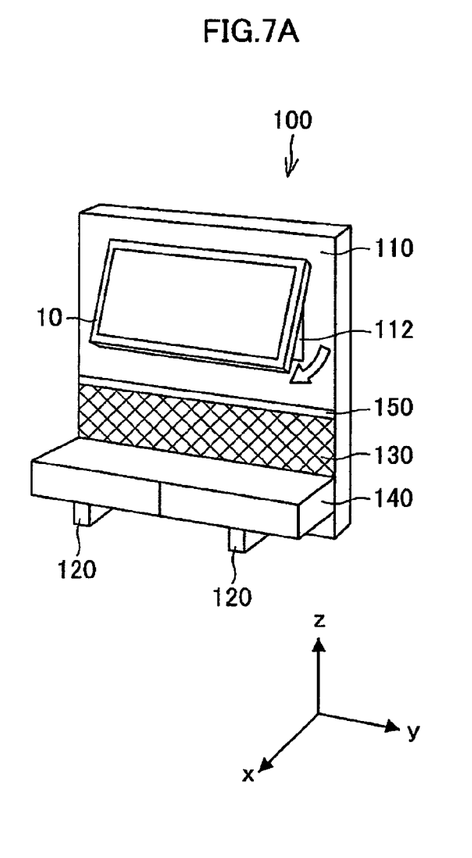
FIG. 7A is an explanation view explaining another example of a displacement of the television by the stand according to the embodiment.
Figure 7B:
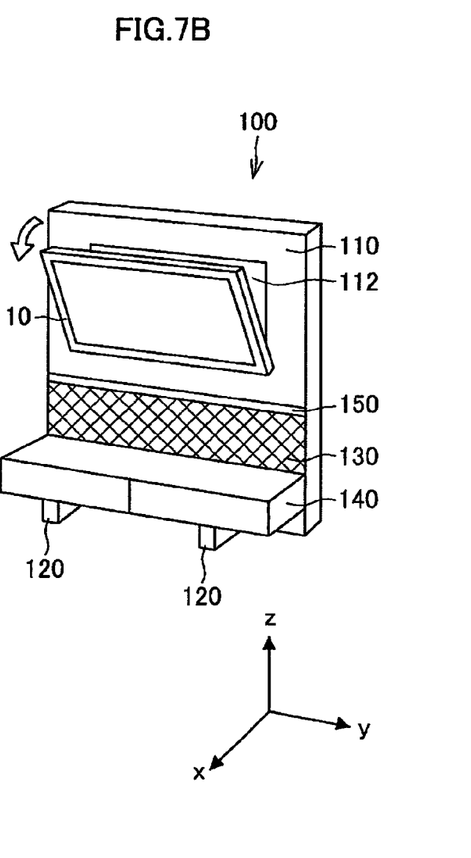
FIG. 7B is an explanation view explaining another example of the displacement of the television by the stand according to the embodiment.

FIG. 6A and FIG. 6B are explanatory views explaining one example of a displacement of a television by the stand according to the present embodiment. Here, FIG. 6A shows a case in which the television 10 is moved in the back and forth direction, and FIG. 6B shows a case in which the direction of the television 10 is inclined in the right and left direction. FIG. 7A and FIG. 7B are explanatory views explaining another example of a displacement of a television by the stand according to the present embodiment. Here, FIG. 7A shows a case in which the television 10 is tilted upward, and FIG. 7B shows a case in which the television 10 is tilted downward.

The stand 100 has an arm member 111 in addition to the above configuration in order to displace the arrangement position of the television 10.

The arm member 111 is arranged between the television 10 and the plane plate member 110, and connects the back face of the television 10 and the front face of the plane plate member 110 and supports the television 10 in such a way that the television 10 may be moved. That is, one end of the arm member 111 is rotatably connected to the plane plate member 110, and the other end is rotatably connected to the television 10.

The arm member 111 will be explained in more details in the following.

One end portion of the arm member 111 is connected to the back face of the television 10 through a television side fixing member 1111, a long hole 1112, a bolt 1113, a connecting member 1114, and a first shaft 1115. Then, the other end portion of the arm member 111 is connected to the plane plate member 110 of the stand 100 through a stand side fixing member 1116, and a second shaft 1117.

More specifically, the television side fixing member 1111 is arranged on the back face of the television 10 as shown in FIG. 5A, and the long hole 1112 is formed on the television side fixing member 1111 wherein the long hole 1112 is formed in a circular arc shape with a center at a point O. Then, the connecting member 1114 is fixed to the television side fixing member 1111 by a bolt 1113 inserted into the long hole 1112. Furthermore, the one end portion of the arm member 111 is connected to the connecting member 1114 through the first shaft 1115 extended and formed vertically (z axis direction) as shown in FIG. 5B.

On the other hand, the stand side fixing member 1116 is arranged on the front face of the plane plate member 110, and the other end portion of the arm member 111 is connected to the stand side fixing member 1116 through the second shaft 1117 extended and formed vertically (z axis direction).

Here, as shown in FIG. 5B, the arm member 111 may be rotated around the second shaft 1117, and the connecting member 1114 may be rotated around the first shaft 1115 to the arm member 111. Furthermore, as shown in FIG. 5A, the television 10 may be rotated around the horizontal axis (y axis) passing through the point O by loosening the bolt 1113 and by being sled along the long hole 1112.

Displacement of the television 10 by the arm member 111 connected as described above will be explained in the following.

(Movement in the Back and Forth Direction)

As shown in FIG. 6A, the arrangement position of the television 10 may be moved in the back and forth direction (x axis direction) in the stand 100. Explaining more specifically, the television 10 contacts the plane plate member 110 of the stand 100 at ordinary use shown in FIG. 1 through FIG. 3. In this case, the arm member 111 is arranged approximately in parallel with the plane plate member 110. The arm member 111 is rotated around the second shaft 1117 (z axis) as a rotation axis. And the television side fixing member 1111 supporting the television 10, and the connecting member 1114 are rotated around the first shaft 1115 (z axis) as a rotation axis. As a result, the television 10 may be moved to a position separated from the plane plate member 110 of the stand 100 by a predetermined distance in the forward direction (in the positive direction of the x axis) as shown in FIG. 6A.

(Inclination in the Right and Left Direction)

As shown in FIG. 6B, the direction of the television 10 may be inclined in the right and left direction (on the xy plane) in the stand 100. Explaining more specifically, the television 10 is arranged toward the front face (in the positive direction of the x axis) in a state in which the television 10 is moved in the back and forth direction as shown in FIG. 5A and FIG. 5B, but, from the above state, the television side fixing member 1111 supporting the television 10, and the connecting member 1114 are rotated around the first shaft 1115 (z axis) as a rotation axis. As a result, the television 10 may be arranged in a direction inclined from the front face (in the positive direction of the x axis) toward the right and left direction (on the xy plane) as shown in FIG. 6B.

(Tilt in Vertical Direction)

As shown in FIG. 7A and FIG. 7B the direction of the television 10 may be inclined in the vertical direction (on the xz plane) in the stand 100. Explaining more specifically, the television 10 may be rotated around the y axis passing through a point O by loosening the bolt 1113 and by sliding the television side fixing member 1111 along the long hole 1112 from a state in which the television 10 is moved forward as shown in shown in FIG. 5A and FIG. 5B. As a result, the television 10 may be arranged toward the vertical direction (on the xz plane) from the front face (in the positive direction of the x axis) as shown in FIG. 7A and FIG. 7B.

As explained above, the television 10 may be moved forward in such a way that the television 10 is separated from the plane plate member 110, the direction of the television 10 may be rotated in the right and left direction, or the television 10 may be vertically tilted, according to the stand 100. Accordingly, access to the back face of the television 10 may be realized because a space may be formed between the television 10 and the plane plate member 110 of the stand 100. That is, as access to the connected terminals and the like arranged on the back face of the television 10 and the like may be performed, improved maintenance may be realized.

Moreover, as the television side fixing member 1111 supporting the television 10, and the connecting member 1114 are coupled to each other by the bolt 1113, the television side fixing member 1111 may be separated from the connecting member 1114 by removing the bolt 1113. That is, the television 10 may be easily detached from the stand 100. Accordingly, when repairing, or arrangement of another television 10 is required, the television 10 may be easily exchanged, and furthermore, improved maintenance may be obtained.

Furthermore, in the wall-hung arrangement according to the related technologies, there has been a possibility that the visibility of the television 10 is reduced even when the television 10 is desired to be seen from a position obliquely forward of the television 10 because it is difficult to adjust the direction of television 10. However, as the direction of the television 10 may be changed in the right and left direction according to the stand 100, it is also possible to improve the visibility of the television 10. In other words, there exists necessity as one factor of maintenance to change the direction of the television 10 in order not to reduce the visibility when the indoor design is changed because the direction from which the television 10 is watched is changed by the indoor design. According to the stand 100, maintenance may be realized, corresponding to changes in the indoor design and the like, by changing the direction of television 10 in the right and left direction.

<Heat Exhausting Unit of Stand 100>

Moreover, the stand 100 according to the present embodiment is provided further with an accommodation portion 112 and a heat exhausting unit. The accommodation portion 112 and the heat exhausting unit will be explained, properly referring to FIG. 4 through FIG. 5B.

The accommodation portion 112 is a hole formed on the front face side of the plane plate member 110 as shown in FIG. 4 through FIG. 5B, and the accommodation portion 112 accommodates at least a part of the back face side of the television 10, and the arm member 111. More specifically, at ordinary use of the television 10, that is, in a state in which the television 10 is not displaced by the arm member 111, the accommodation portion 112 is formed open to the back face direction of the television 10 at a position facing the television 10 of plane plate member 110. Preferably, the accommodation portion 112 has approximately the same external shape as that of the television 10, or a smaller one. In other words, the accommodation portion 112 is formed in the plane plate member 110 on the back side of the television 10, and the position and size of the accommodation portion 112 may not be viewed at ordinary use of the television 10.

As at least a part of the back face side of the television 10 is accommodated in the accommodation portion 112 to reduce a level difference between the television 10 and the plane plate member 110, integration feeling of the television 10 and the stand 100 may be further improved.

The heat exhausting unit is formed on the back face side of the plane plate member 110, and heat generated by the television 10 is exhausted from the accommodation portion 112. As shown in FIG. 5A, the stand 100 according to the present embodiment is provided with a first heat exhausting hole 113, and a second heat exhausting hole 114 as one example of the heat exhausting unit.

The first heat exhausting hole 113 is one example of a heat exhausting hole by which heat generated by the television 10 is exhausted toward above the plane plate member 110 from the accommodation portion 112. The first heat exhausting hole 113 is formed on the back face side of the plane plate member 110, and penetrates from the accommodation portion 112 toward above the plane plate member 110. That is, the first heat exhausting hole 113 is formed as a hole for communication of the accommodation portion 112 with a space outside the plane plate member 110. In this case, the accommodation portion 112 may be communicated with the wall surface W by the first heat exhausting hole 113.

The second heat exhausting hole 114 is one example of a heat exhausting hole through which heat generated by the television 10 is exhausted. The second heat exhausting hole 114 is formed as a hole communicating the accommodation portion 112 with the wall surface W. The second heat exhausting hole 114 is formed in such a way that the lower side of the accommodation portion 112 is communicated with the wall surface W, for example, as shown in FIG. 5A.

Moreover, for example, when the plane plate member 110 is formed by connecting the first plate member 110A arranged forward and the second plate member 110B arranged backward, there may be provided a configuration in which the accommodation portion 112 is formed by making a hole in the first plate member 110A, and the first heat exhausting hole 113 and the second heat exhausting hole 114 are formed by making a hole in the second plate member 110B.

On the other hand, at ordinary use of the television 10 before the television 10 is displaced by the arm member 111 and the like, the accommodation portion 112 is in a state in which the forward portion (in the positive direction of the x axis) of the accommodation portion 112 is closed by the back face of the television 10 because at least a part of the television 10 is accommodated in the accommodation portion 112, and the television 10 is arranged in contact with the stand 100. Accordingly, heat generated from the television 10 is transmitted to the air in the accommodation portion 112. However, the stand 100 according to the present embodiment may discharge heat generated from the television 10 to the space above the stand 100 and the wall surface W through the above-described first heat exhausting hole 113, and the above-described second heat exhausting hole 114.

Accordingly, according to the wall-hung arrangement and the like based on the related technologies, heat generated from the television 10 is transmitted only to the wall surface W and the like in some cases, or the worse efficiency is obtained in other cases. Then, the heat has caused harmful influence in some cases in which the television 10 is arranged in an integrated state with the wall surface. That is, a certain degree of heat resistance is required for the wall surface W, and, moreover, the television 10 with a high allowable temperature has been required to be used. However, based on the stand 100 according to the present embodiment, the heat may be discharged through the first heat exhausting hole 113 and the second heat exhausting hole 114 to improve the heat efficiency. Accordingly, necessity for considering the heat resistance of the wall surface W and the allowable temperature of the television 10 may be reduced. Accordingly, according to the stand 100 based on the present embodiment integration of the television 10 and the wall surface W, and, at the same time, easy arrangement of them may be realized.

<Configuration Included in Stand 100>

Figure 8:
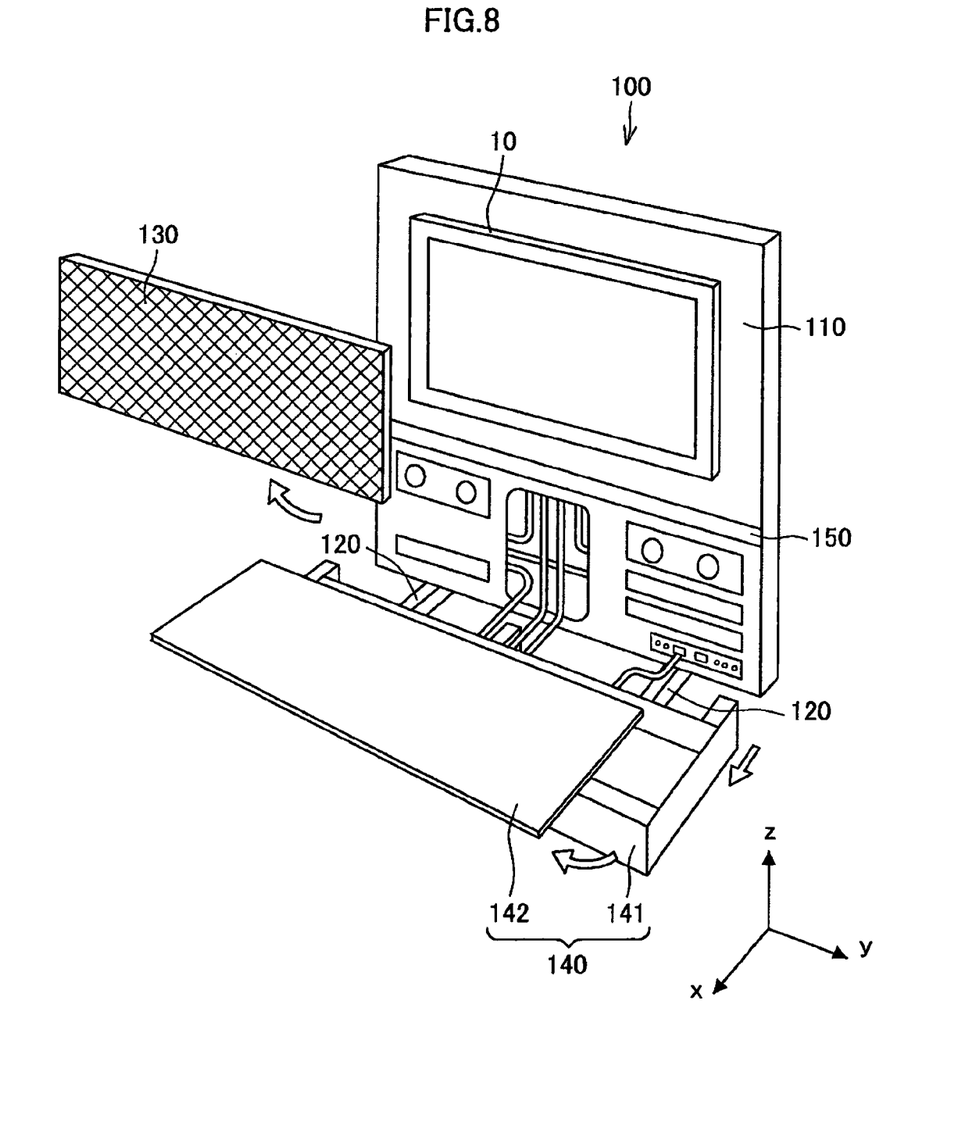
FIG. 8 is an explanation view explaining the stand according to the embodiment.
Figure 9:
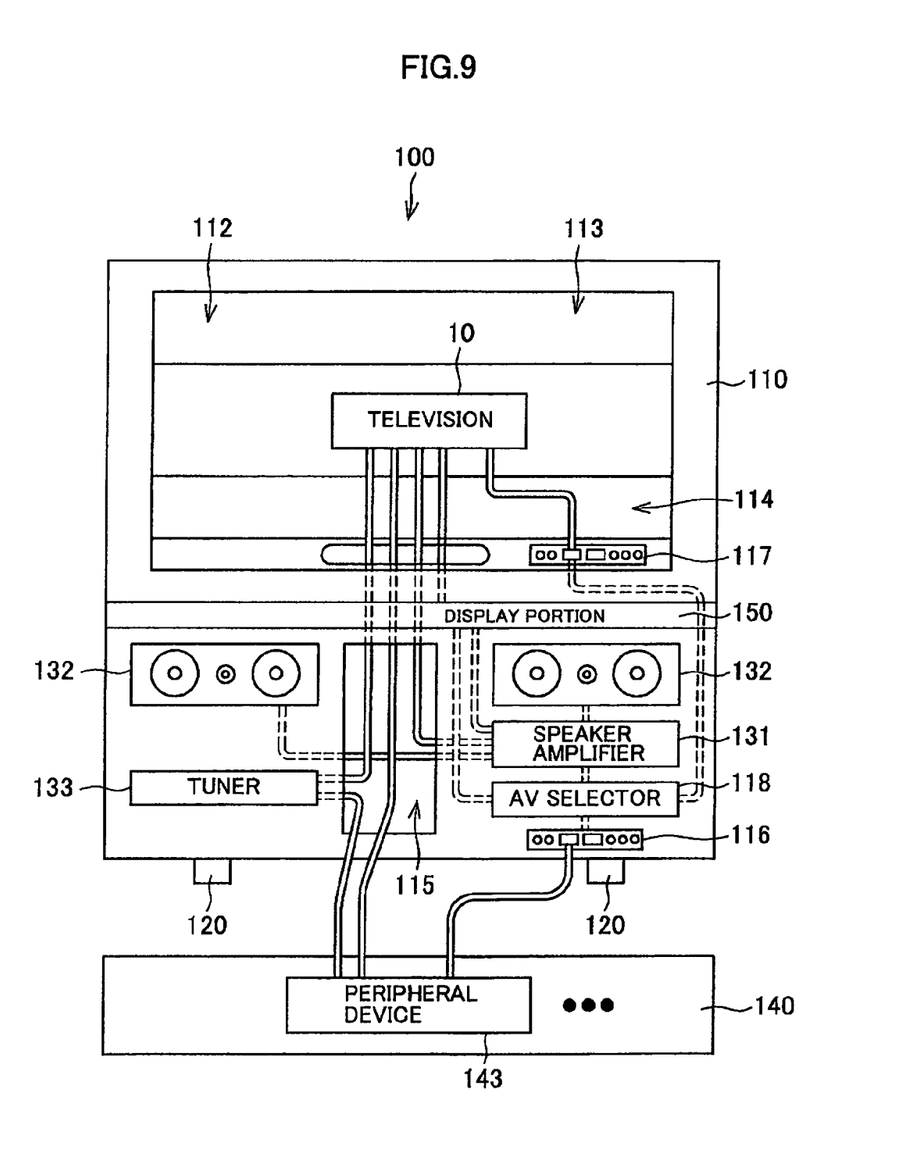
FIG. 9 is an explanation view explaining the configuration of the stand according to the embodiment.

Then, a configuration included in the stand 100 will be explained referring to FIG. 8 and FIG. 9. FIG. 8 is an explanatory view explaining a stand according to the present embodiment. FIG. 9 is an explanatory view explaining a configuration of the stand according to the present embodiment.

As shown in FIG. 8, the net grill 130 and the rack 140 included in the stand 100 as a configuration which may be visually checked may be moved. More specifically, the net grill 130 is arranged in the front of the plane plate member 110 as described above, and may be detached from the plane plate member 110. Then, the rack 140 is mounted on the leg portion 120 in contact with the plane plate member 110 at ordinary use as described above, and may be sled forward (x axis direction) for changing the wires of the peripheral devices for the television 10 wherein the wires are internally accommodated.

Moreover, the rack 140 is configured to include an upper lid 141, and a main body portion 142. Then, the upper lid 141 is arranged in such a way that the lid 141 may be detached from the main body portion 142. Therefore, the peripheral devices accommodated in the rack 140 may be easily accessed. Then, the front face of the rack 140 is formed of a material through which a communication electric wave such as infrared rays passes between a peripheral device and a remote controller. Accordingly, the peripheral devices accommodated in the rack 140 may be operated by a remote controller and the like.

FIG. 8 and FIG. 9 show a state in which the net grill 130 and the rack 140 are moved. As shown in FIG. 8, the stand 100 may easily access a component provided in the interior by moving the net grill 130 and the rack 140. The interior configuration will be explained referring to FIG. 9.

As shown in FIG. 9, the stand 100 is provided with a wiring space 115, a first connector 116, a second connector 117, an AV selector 118, a speaker arrangement portion, and a tuner arrangement portion.

The wiring space 115 is a space which accommodates wires connected to the television 10, the peripheral devices 143, the display portion 150, and the like, and is arranged below the arrangement position of the television 10 in the front of the plane plate member 110 in contact with the net grill 130. The wiring space 115 is configured to easily be accessed by detaching the net grill 130. More concretely, the wiring space 115 is formed as a hole opened at least to the front of the plane plate member 110, and the accommodation portion 112. Accordingly, for example, wires from the television 10 may be connected to the peripheral devices 143 and the like accommodated in the rack 140 from the accommodation portion 112 through the wiring space 115. As internally arranged wires may be easily accessed only by detaching the net grill 130 according to the wiring space 115, further easier arrangement and maintenance of the stand 100 may be realized.

The first connector 116 is one example of the first connection portion, which connects wires for input and output of images, voices, and other information to the peripheral devices 143 accommodated in the rack 140, and is arranged at a position facing the rack 140 in the front of the plane plate member 110. Accordingly, wires connected to the peripheral device 143 may be easily connected to the first connector 116 by sliding the rack 140.

The second connector 117 is one example of a connector which connects wires for input and output of images, voices, and other information to the television 10, and is arranged at a position facing the television 10 on the plane plate member 110. Accordingly, wires connected to the television 10 may be easily connected to the first connector 116 by displacing the television 10 and the like by the arm member 111 and the like.

The AV selector 118 is one example of a selection portion which is connected to the first connector 116 and the second connector 117, and which selectively performs switching between input/output from the television 10 to the peripheral devices 143, and that from the peripheral devices 143 to the television 10, and is arranged at a position facing the net grill 130 of the plane plate member 110. That is, for example, when a plurality of the peripheral devices 143 are arranged in the rack 140, wires from these peripheral devices 143 are connected to the AV selector 118 through the first connector 116. Then, the AV selector 118 selects which peripheral device 143 among the plurality of peripheral devices 143 is connected to the television 10. Then, the AV selector 118 connects the selected peripheral device 143 and the television 10 connected through the second connector 117. Accordingly, the AV selector 118 selects a signal, which is output to the television 10 through the second connector 117, among signals which are output from each of a plurality of the peripheral devices 143 and are input through the first connector 116.

Moreover, the AV selector 118 is also connected to a speaker amplifier 131, selects which peripheral device 143 is connected to the speaker amplifier 131, and connects the selected peripheral device 143 and the speaker amplifier 131. Then, the AV selector 118 is also connected to the display portion 150, and outputs information, on which peripheral device 143 has been selected, to the display portion 150.

Then, the switching by the AV selector 118 may be performed, for example, by receiving a wireless signal of, for example, infrared rays, from the outside remote controller.

As wiring to the television 10 may be simplified by including the AV selector 118, troublesome wiring work may be decreased. Accordingly, arrangement and maintenance of the stand 100 may be improved.

Each of the speaker arrangement portion, and the tuner arrangement portion is formed at a position facing the net grill 130 on the plane plate member 110. Then, the speaker amplifier 131, and a speaker unit 132 are arranged in the speaker arrangement portion, and a tuner 133 is arranged in the tuner arrangement portion.

The speaker amplifier 131 is connected to the television 10, the AV selector 118, and the speaker unit 132, and a voice signal from the peripheral device 143 is amplified for output to the speaker unit 132, wherein the voice signal has been selected through the AV selector 118. Moreover, the speaker amplifier 131 is also connected to the display portion 150, and outputs information on volumes to the display portion 150, wherein the information represents an amplification degree of a voice signal of the speaker amplifier 131. The speaker unit 132 is a speaker which outputs a voice signal input from the speaker amplifier 131.

The tuner 133 is connected to a receiver and the like (not shown) for wirelesses and cable broadcasting from the outside, the television 10, and the peripheral devices 143, and demodulates a reception signal received by the receiver and the like to a voice signal, an image signal, and the like for output to the television 10 and the peripheral devices 143.

As described above, the stand 100 may arrange the speaker amplifier 131, the speaker unit 132, the tuner 133 and the like in the plane plate member 110. Therefore, a functional integration feeling among the television 10, the peripheral device 143 and the stand 100 may be given. Accordingly, the integration between the television 10 and the wall surface W may be improved by further improving the integration feeling between the television 10 and the stand 100.

<Display Example of Display Portion 150>

Figure 10A:
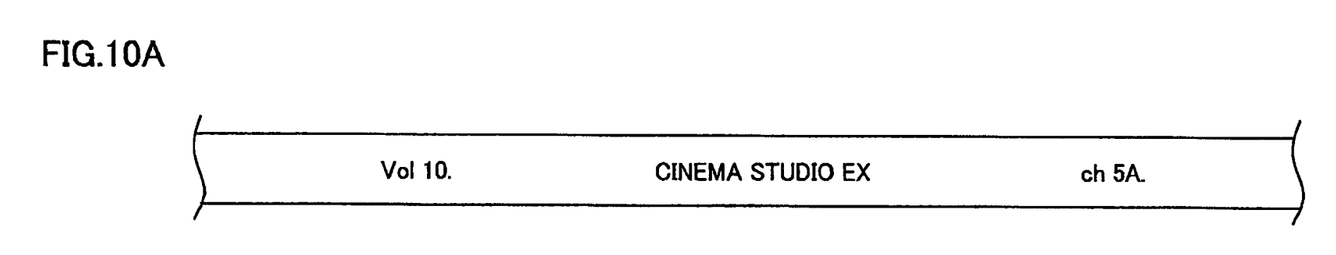
FIG. 10A is an explanation view explaining a display example of a display portion included in the stand according to the embodiment.
Figure 10B:
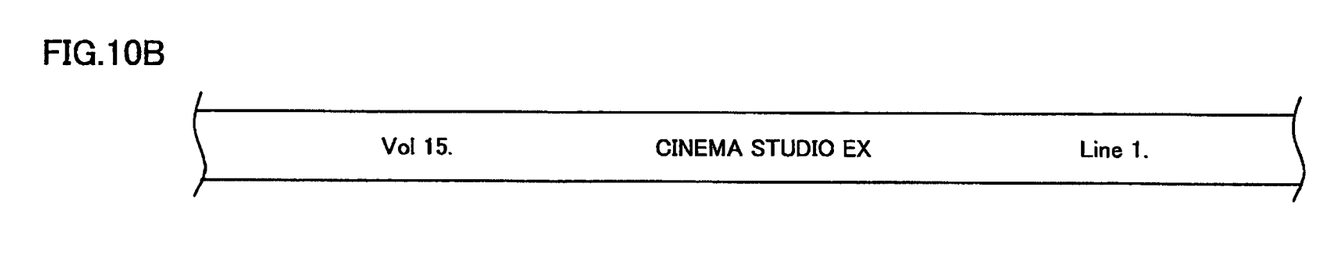
FIG. 10B is an explanation view explaining a display example of a display portion included in the stand according to the embodiment.

Then, the above-described display portion 150 included in the stand 100 as a viewable configuration will be explained referring to FIG. 9, FIG. 10A and FIG. 10B. FIG. 10A and FIG. 10B are explanatory views explaining a display example of the display portion included in the stand according to the present embodiment.

The display portion 150 is a member which displays operation states of the television 10 as described above, and is arranged at a viewable position in the front of the plane plate member 110 at ordinary use. For example, FIG. 9 shows an example in which the display portion 150 is arranged below the television 10, and in the front of the plane plate member 110 above the arrangement position of the net grill 130. However, the arrangement position of the display portion 150 is not limited to the above example, and may be at any viewable position at ordinary use. Then, the display portion 150 includes a display device such as an FL tube, a liquid crystal display, a plasma display, an organic electronic luminescence display.

The display portion 150 is connected to the television 10, the AV selector 118, and the speaker amplifier 131 as one example. Then, the television 10 outputs information representing attributes of a displayed image to the display portion 150, wherein the attributes includes, for example, a channel number, and an input line number. The AV selector 118 outputs, for example, information representing a line to the display portion 150, wherein a peripheral device 143 selected for output to the television 10 is connected to the line. Then, the speaker amplifier 131 outputs volume information representing the amplified amount to the display portion 150. Then, the display portion 150 displays information from the television 10, the AV selector 118, the speaker amplifier 131, and the like.

More specifically, for example, when a user views a television broadcasting program received by the tuner 133, the television 10 outputs information on the channel viewed by the user. Then, the display portion 150 displays the information on the channel. FIG. 10A shows a display example in which a user selects and views a channel 5A (ch 5A.) of television broadcasting. Moreover, for example, when a plurality of peripheral devices 143 is connected to the second connector 117, and a user views an image from a video deck which is one example of the peripheral device 143, the AV selector 118 outputs information representing a line to which the video deck is connected, that is, a line which is connected to the television 10 through the first connector 116. Then, the display portion 150 displays information on the line. FIG. 10B shows a display example in which a user views an image from a video deck, and the video deck is connected to a line 1 (Line 1.). Furthermore, FIG. 10A shows, for example, a case in which the volume of the speaker amplifier 131 is "10", and FIG. 10B shows, for example, a case in which the volume thereof is "15".

Integration feeling of the television 10 and the stand 100 may be further improved because the stand 100 displays an operation state of the television 10 on the display portion 150 as described above, and functional integration feeling may be given between the television 10 and the stand 100. As a result, the integration feeling between the television 10 and the wall surface W may be further improved, and the television 10 may be arranged in a harmonized state with the indoor design.

<Effects of Stand 100 According to the Present Embodiment>

The stand 100 according to the present embodiment has been explained as described above.

According to the stand 100, the television 10 may be easily arranged in an integrated state with the wall surface W, because the television 10 may be arranged in a contacted state with the wall surface W by the plane plate member 110 and the leg portion 120. Moreover, the integration feeling of the television 10 and the stand 100 may be further improved, because the external shape of the plane plate member 110 is formed in such a way that the external shape covers the whole of the television 10 when viewed from the front. Accordingly, proximity feeling of the television 10 to the wall surface W may be given to a user using the stand 100, and the both may be arranged in a further integrated state.

Moreover, the back face of the television 10 may be easily accessed by providing the arm member 111 by which the arrangement position, and the arrangement attitude of the television 10 may be changed. Accordingly, easy arrangement may be realized without requiring another work and the like for arrangement of the stand 100, and for maintenance. Moreover, the maintenance after arrangement may be improved.

Moreover, the television 10 may be arranged in an integrated state with the wall surface W as one body without losing integration feeling of the television 10 and the wall surface W by exposed wiring, because wiring may be prevented from exposing to the outside of the stand 100 by providing the wiring space 115 in the plane plate member 110. Moreover, wiring at arrangement and at maintenance may be easily performed because the wiring space 115 may be easily accessed by detaching the net grill 130.

Moreover, the television 10 and the wall surface W may be integrated with each other in a more improved manner, because the proximity feeling of the television 10 to the plane plate member 110 may be further improved by a configuration in which the accommodation portion 112 accommodating at least a part of the back face side of the television 10 is formed in the plane plate member 110. Moreover, the heat efficiency may be improved, and the stand 100 may be arranged in a contacted state with the wall surface W, because heat from the television 10 may be exhausted from the accommodation portion 112 by the first heat exhausting hole 113, and the second heat exhausting hole 114.

In addition to the above-described effects, the stand 100 according to the present embodiment may demonstrate the above-described effects and the like by other components. By the above-described results, easy arrangement may be realized, and the maintenance may be improved while the television 10 is integrated with the wall surface W for arrangement.

It should be understood by those skilled in the art that various modifications, combinations, sub-combinations and alterations may occur depending on design requirements and other factors insofar as they are within the scope of the appended claims or the equivalents thereof.

Though a concrete configuration of the arm member 111 supporting the television 10 has been explained, for example, in the above-described embodiments, the present invention is not limited to the above examples. Acceptably, the arm member 111 having a configuration, in which the arrangement position and the arrangement attitude of the television 10 may be changed, is configured to have any shape and any configuration.

Figure 11:
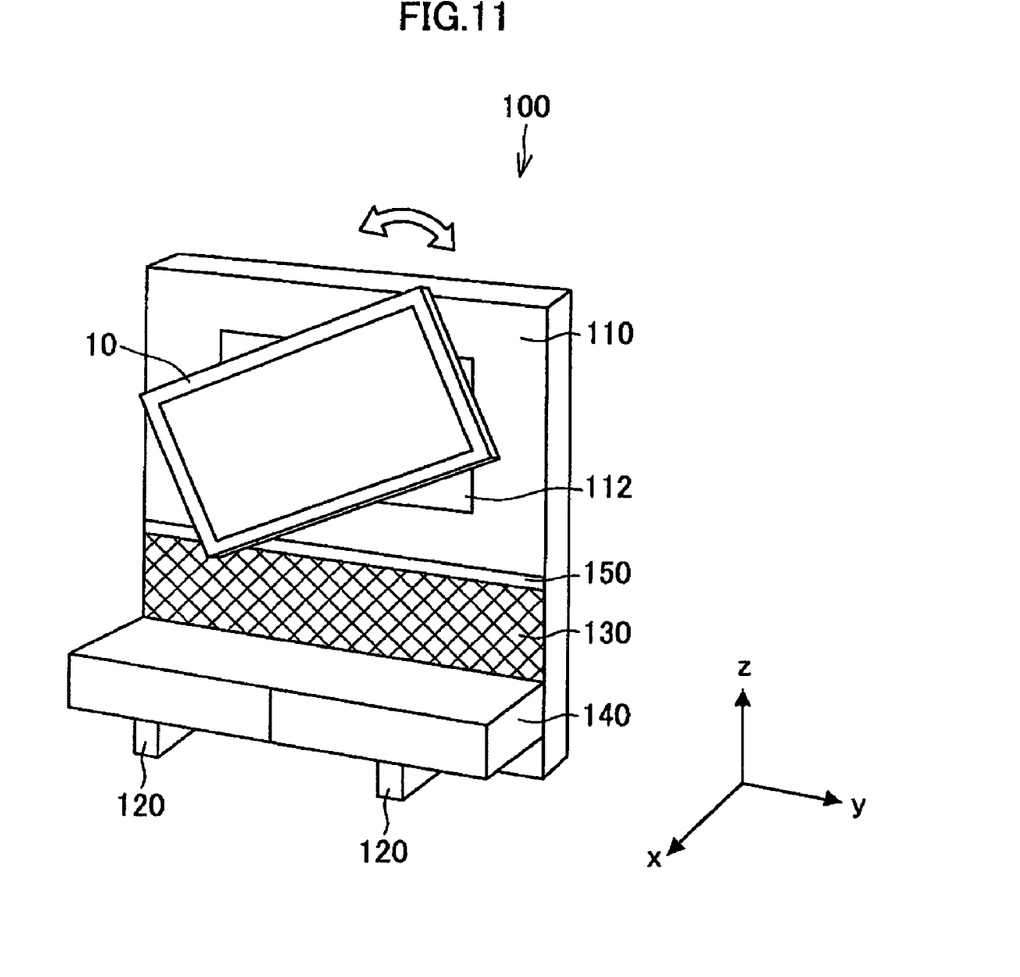
FIG. 11 is an explanation view explaining another example of a displacement of a television by the stand according to the embodiment.

The present invention is not limited to the above example, though movement in the back and forth direction, inclination in the right and left direction, and tilt in the vertical direction have been explained as changes in the arrangement position and the arrangement attitude of the television 10 supported by the arm member 111, for example, in the above-described embodiments. For example, as shown in FIG. 11, the television 10 may be supported in such a way that the television 10 may be rotated around an axis (x axis) in the back and forth direction as a rotation axis by the arm member 111. In this case, the television 10 may be rotated around an axis (x axis) in the back and forth direction by a configuration in which, for example, the arm member 111 and the like is connected to other members through the third shaft and the like, which are extended and formed in the direction of an axis (x axis) in the back and forth direction, and the television 10 is supported in such a way that the television 10 may be rotated around the third shaft. However, it is obvious that the structure of the arm member 111 and the like is not limited to the above example.

Though the first heat exhausting hole 113 and the second heat exhausting hole 114 have been explained as a heat exhausting hole of one example of the exhausting unit in the above-described embodiments, the present invention is not limited to the above examples, and it is acceptable that the heat exhausting hole according to the present invention has an arbitrary shape and the number of the holes is arbitrary.

Though the exhausting unit has been assumed to be the first heat exhausting hole 113 and the second heat exhausting hole 114 in the above-described embodiments, the present invention is not limited to the above examples. For example, the stand 100 may be provided with a fan as an exhausting unit in such a way that air in the accommodation portion 112 is exhausted to the outside of the plane plate member 110. Moreover, it is also possible to combine the fan with an arbitrary heat exhausting hole such as the first heat exhausting hole 113, and the second heat exhausting hole 114.

Though information on channels from the television 10, information on lines selected by the AV selector 118, information on volumes of the speaker amplifier 131, and the like are displayed as operation states of the television 10, which are displayed on the display portion 150 in the above-described embodiments, the present invention is not limited to the above examples. There may be provided, for example, a configuration in which information on set situations of the television 10 is acquired from the television 10, and the display portion 150 displays the information on the set situations of the television 10. Though information on the set situations includes, for example, a display mode, a display brightness, the width and the height of a display screen, a distortion degree of an image, a display contrast, and the like for animations, still pictures, and the like, the present invention is not limited to the above examples.

Moreover, though the above-described embodiments have had the display portion 150 in which information on selected lines is input from the AV selector 118, and information on volumes is input from the speaker amplifier 131, the present invention is not limited to the above-described examples. There may be provided, for example, a configuration in which, in the display portion 150, at least one of information on a selected line, or information on volumes is acquired from the television 10 for display.

Furthermore, the display portion 150 has been assumed to be connected to the television 10, the AV selector 118, and the speaker amplifier 131 in the above-described embodiments.

However the present invention is not limited to the above examples. There may be provided, for example, a configuration in which the display portion 150 is also connected to the peripheral device 143, and displays the operation states of the peripheral device 143. More specifically, the display portion 150 may display a recorded time zone, a channel, a program title, reproduction time, remaining reproduction time, and the like of an image under reproduction when the peripheral device 143 is an HDD recorder. Thus, the peripheral device 143 may be accommodated in the rack 140 in such a way that the peripheral device 143 may not be viewed from the outside, because the operation situations of the peripheral device 143 may be grasped by a configuration in which the display portion 150 displays the operation states of the peripheral device 143. Accordingly, integration of the stand 100 and the wall surface W may be improved, because the peripheral device 143 and the like may be arranged in such a way that a user may not view the device 143 though each of the appearance shapes of the devices has a different shape, and is not necessarily formed with a shape in harmony with the indoor design. As a result of the above configurations, the stand 100, the television 10, and the peripheral device 143 may be further in better harmony with the indoor design.

Though the above-described embodiment has had a configuration in which, in the stand 100, the speaker amplifier 131, the speaker unit 132, and the tuner 133 are configured to be arranged in the plane plate member 110, the present invention is not limited to the above example. Acceptably, for example, at least one of the speaker amplifier 131, the speaker unit 132, and the tuner 133 is not accommodated in the plane plate member 110. Acceptably, a peripheral device such as an HDD recorder, and a video deck is further arranged in the plane plate member 110.

Moreover, though the above-described embodiments have had a configuration in which the speaker amplifier 131, the speaker unit 132, and the tuner 133 are arranged at positions facing the net grill 130 of the plane plate member 110, the present invention is not limited to the above examples, and the above components may be arranged at any positions in the interior, or in the front of the plane plate member 110.

What is claimed is:

1. A stand for supporting an image display device, the stand comprising:
    a plane plate member in which an outside dimension is larger than that of an outside frame of the image display device, the plane plate member having a back face arranged in such a way that the back face may contact a wall surface external to the stand;
    a leg portion installed to be on an opposite side to the wall surface at a lower end of the plane plate member; and
    an arm member having one end to rotatably connect about a first axis to a back face of the image display device, another end rotatably connected about a second axis to a front face of the plane plate member, the second axis extending in a same axial direction that the first axis extends, and further, when the one end of the arm member is rotatably connected about the first axis to the back face of the image display device, connecting the back face of the image display device and the front face of the plane plate member in such a way that the image display device may be moved to rotate about a third axis, the third axis extending in an axial direction perpendicular to the first axis, to be inclined in the direction of the first axis.

2. The stand for an image display device according to claim 1, comprising:
    an accommodation portion which is formed on the front face of the plane plate member and may accommodate at least a part of the back face of the image display device; and
    a heat exhausting unit which is arranged on the back face of the plane plate member, and by which heat generated by the image display device is exhausted from the accommodation portion.

3. The stand for an image display device according to claim 2, wherein the heat exhausting unit is a heat exhausting hole which is formed on the back face side of the plane plate member, and extends from the accommodation portion toward above the plane plate member.

4. The stand for an image display device according to claim 1, wherein a wiring space is formed below an arrangement position of the image display device of the plane plate member, and is open to the front face direction of the plane plate member, and wires for the image display device are arrangeable in the wiring space.

5. The stand for an image display device according to claim 1, further comprising
    a peripheral-device accommodation portion which is slidably arranged on the leg portion, and accommodates peripheral devices connected to the image display device.

6. The stand for an image display device according to claim 5, further comprising:
    a first connection portion which is arranged at a position facing the peripheral-device accommodation portion of the plane plate member, and may connect wires from a plurality of peripheral devices which are accommodated in the peripheral-device accommodation portion;
    a second connection portion which is arranged at a position to face the image display device of the plane plate member, and may connect wires to the image display device; and
    a selection portion which is connected to the first connection portion and the second connection portion, and selects a signal output to the image display device through the second connection portion from signals output respectively from the plurality of peripheral devices and input to the first connection portion.

7. The stand for an image display device according to claim 1, further comprising
    a display portion which is arranged on the front face of the plane plate member, and displays operation states of the image display device.

8. The stand for an image display device according to claim 1, wherein the plane plate member further includes a speaker arrangement portion in which a speaker unit and a speaker amplifier are arrangeable.

9. The stand for an image display device according to claim 1, wherein the plane plate member further includes a tuner arrangement portion in which a television tuner is arrangeable.

* * * * *